(12) United States Patent
Lilikov et al.

(10) Patent No.: US 8,380,634 B2
(45) Date of Patent: *Feb. 19, 2013

(54) FIRST COMPUTER PROCESS AND SECOND COMPUTER PROCESS PROXY-EXECUTING CODE ON BEHALF OF FIRST PROCESS

(75) Inventors: Andrey Lilikov, Redmond, WA (US); Donald H. Rule, Mercer Island, WA (US); Kristjan E. Hatlelid, Sammamish, WA (US); Nir Ben Zvi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/332,698

(22) Filed: Dec. 21, 2011

(65) Prior Publication Data

US 2012/0096566 A1 Apr. 19, 2012

Related U.S. Application Data

(60) Division of application No. 11/273,775, filed on Nov. 14, 2005, now Pat. No. 8,103,592, which is a continuation-in-part of application No. 10/681,017, filed on Oct. 8, 2003, now Pat. No. 7,788,496.

(51) Int. Cl.
*G06F 21/00* (2006.01)

(52) U.S. Cl. ............... 705/59; 705/51; 705/78; 726/2; 726/22; 726/26; 726/27; 726/30; 713/150; 713/182; 713/189

(58) Field of Classification Search ............ 705/50, 705/59; 713/193, 150, 182, 189; 726/2, 726/26, 22, 27, 30

See application file for complete search history.

(56) References Cited

U.S. PATENT DOCUMENTS

| | | | | |
|---|---|---|---|---|
| 3,718,906 | A * | 2/1973 | Lightner | 379/77 |
| 4,323,921 | A * | 4/1982 | Guillou | 705/53 |
| 4,523,643 | A * | 6/1985 | McGlothen | 166/297 |
| 4,528,643 | A | 7/1985 | Freeny, Jr. | |
| 4,658,093 | A * | 4/1987 | Hellman | 705/52 |
| 4,683,553 | A * | 7/1987 | Mollier | 705/55 |
| 4,780,821 | A * | 10/1988 | Crossley | 718/100 |
| 4,827,508 | A * | 5/1989 | Shear | 705/53 |
| 4,916,738 | A * | 4/1990 | Chandra et al. | 713/159 |
| 4,926,479 | A * | 5/1990 | Goldwasser et al. | 713/180 |
| 4,953,209 | A * | 8/1990 | Ryder et al. | 705/59 |

(Continued)

FOREIGN PATENT DOCUMENTS

| | | |
|---|---|---|
| CN | 1500242 A | 5/2004 |
| EP | 0715246 A1 | 6/1996 |

(Continued)

OTHER PUBLICATIONS

"Aladdin Knowledge Systems Partners with Rights Exchange, Inc. to Develop a Comprehensive Solution for Electronic Software Distribution", Aug. 3, 1998, 5 pages.

(Continued)

*Primary Examiner* — Mamon Obeid
(74) *Attorney, Agent, or Firm* — Woodcock Washburn LLP

(57) ABSTRACT

Upon a first process encountering a triggering device, a second process chooses whether to proxy-execute code corresponding to the triggering device of the first process on behalf of such first process based at least in part on whether a license evaluator of the second process has determined that the first process is to be operated in accordance with the terms and conditions of a corresponding digital license. The license evaluator at least in part performs such determination by running a script corresponding to the triggering device in the code of the first process. Thus, the first process is dependent upon the second process and the license for operation thereof.

14 Claims, 7 Drawing Sheets

U.S. PATENT DOCUMENTS

| | | | |
|---|---|---|---|
| 4,977,594 A * | 12/1990 | Shear | 705/53 |
| 5,050,213 A * | 9/1991 | Shear | 705/53 |
| 5,103,392 A * | 4/1992 | Mori | 705/52 |
| 5,103,476 A * | 4/1992 | Waite et al. | 705/59 |
| 5,109,413 A * | 4/1992 | Comerford et al. | 705/54 |
| 5,117,457 A * | 5/1992 | Comerford et al. | 713/194 |
| 5,138,712 A * | 8/1992 | Corbin | 726/30 |
| 5,193,573 A * | 3/1993 | Chronister | 137/315.19 |
| 5,204,897 A * | 4/1993 | Wyman | 710/200 |
| 5,222,134 A * | 6/1993 | Waite et al. | 705/59 |
| 5,261,002 A * | 11/1993 | Perlman et al. | 380/30 |
| 5,294,792 A * | 3/1994 | Lewis et al. | 250/221 |
| 5,319,705 A * | 6/1994 | Halter et al. | 705/54 |
| 5,339,426 A * | 8/1994 | Aoshima | 713/1 |
| 5,375,240 A * | 12/1994 | Grundy | 726/28 |
| 5,408,250 A * | 4/1995 | Bier | 345/169 |
| 5,410,598 A * | 4/1995 | Shear | 705/53 |
| 5,434,594 A * | 7/1995 | Martinelli et al. | 345/163 |
| 5,473,692 A * | 12/1995 | Davis | 705/59 |
| 5,485,607 A * | 1/1996 | Lomet et al. | 1/1 |
| 5,490,216 A * | 2/1996 | Richardson, III | 705/59 |
| 5,509,070 A * | 4/1996 | Schull | 705/54 |
| 5,608,894 A * | 3/1997 | Kawakami et al. | 717/162 |
| 5,629,980 A * | 5/1997 | Stefik et al. | 705/54 |
| 5,634,012 A * | 5/1997 | Stefik et al. | 705/39 |
| 5,638,443 A * | 6/1997 | Stefik et al. | 705/54 |
| 5,652,412 A * | 7/1997 | Lazzouni et al. | 178/18.01 |
| 5,671,396 A * | 9/1997 | Gavish | 703/27 |
| 5,673,316 A * | 9/1997 | Auerbach et al. | 705/51 |
| 5,710,887 A * | 1/1998 | Chelliah et al. | 705/26.62 |
| 5,715,403 A * | 2/1998 | Stefik | 705/44 |
| 5,729,251 A * | 3/1998 | Nakashima | 709/250 |
| 5,765,152 A * | 6/1998 | Erickson | 1/1 |
| 5,809,144 A * | 9/1998 | Sirbu et al. | 705/53 |
| 5,845,281 A * | 12/1998 | Benson et al. | 1/1 |
| 5,867,699 A * | 2/1999 | Kuslak et al. | 712/240 |
| 5,892,900 A * | 4/1999 | Ginter et al. | 726/26 |
| 5,917,912 A * | 6/1999 | Ginter et al. | 713/187 |
| 5,933,497 A * | 8/1999 | Beetcher et al. | 705/59 |
| 5,953,420 A * | 9/1999 | Matyas et al. | 713/193 |
| 5,956,505 A * | 9/1999 | Manduley | 713/1 |
| 5,991,790 A * | 11/1999 | Shah et al. | 718/100 |
| 6,006,328 A * | 12/1999 | Drake | 726/23 |
| 6,073,124 A * | 6/2000 | Krishnan et al. | 705/59 |
| 6,078,909 A * | 6/2000 | Knutson | 705/59 |
| 6,094,487 A * | 7/2000 | Butler et al. | 380/270 |
| 6,130,666 A * | 10/2000 | Persidsky | 345/179 |
| 6,189,146 B1 * | 2/2001 | Misra et al. | 717/177 |
| 6,219,652 B1 * | 4/2001 | Carter et al. | 705/59 |
| 6,226,618 B1 * | 5/2001 | Downs et al. | 705/51 |
| 6,233,567 B1 * | 5/2001 | Cohen | 705/59 |
| 6,243,480 B1 * | 6/2001 | Zhao et al. | 382/100 |
| 6,289,452 B1 * | 9/2001 | Arnold et al. | 713/175 |
| 6,289,708 B1 * | 9/2001 | Keinanen | 72/14 |
| 6,330,670 B1 * | 12/2001 | England et al. | 713/2 |
| 6,343,280 B2 * | 1/2002 | Clark | 705/55 |
| 6,389,538 B1 * | 5/2002 | Gruse et al. | 713/194 |
| 6,405,316 B1 * | 6/2002 | Krishnan et al. | 713/190 |
| 6,486,875 B1 * | 11/2002 | O'Donnell, Jr. | 345/179 |
| 6,502,102 B1 * | 12/2002 | Haswell et al. | 1/1 |
| 6,574,609 B1 * | 6/2003 | Downs et al. | 705/50 |
| 6,574,612 B1 * | 6/2003 | Baratti et al. | 705/59 |
| 6,668,325 B1 * | 12/2003 | Collberg et al. | 713/194 |
| 6,671,813 B2 * | 12/2003 | Ananda | 726/3 |
| 6,681,017 B1 * | 1/2004 | Matias et al. | 380/277 |
| 6,683,546 B1 * | 1/2004 | Torrubia-Saez | 341/51 |
| 6,686,579 B2 * | 2/2004 | Fagin et al. | 250/208.1 |
| 6,701,514 B1 * | 3/2004 | Haswell et al. | 717/175 |
| 6,718,535 B1 * | 4/2004 | Underwood | 717/101 |
| 6,772,340 B1 * | 8/2004 | Peinado et al. | 713/168 |
| 6,775,728 B2 * | 8/2004 | Zimmer et al. | 710/260 |
| 6,806,868 B2 * | 10/2004 | Chuang | 345/179 |
| 6,810,389 B1 * | 10/2004 | Meyer | 705/59 |
| 6,829,708 B1 * | 12/2004 | Peinado et al. | 713/156 |
| 6,831,632 B2 * | 12/2004 | Vardi | 345/179 |
| 6,832,319 B1 * | 12/2004 | Bell et al. | 713/193 |
| 6,845,908 B2 * | 1/2005 | Morita et al. | 235/382 |
| 6,931,542 B1 * | 8/2005 | Gregoire | 713/193 |
| 6,933,919 B1 * | 8/2005 | Anderson et al. | 345/156 |
| 6,952,564 B2 * | 10/2005 | Gannholm | 455/84 |
| 6,956,564 B1 | 10/2005 | Williams | |
| 6,959,441 B2 * | 10/2005 | Moore | 719/328 |
| 6,961,941 B1 * | 11/2005 | Nelson et al. | 719/319 |
| 7,030,864 B2 * | 4/2006 | Yueh | 345/179 |
| 7,069,595 B2 * | 6/2006 | Cognigni et al. | 726/26 |
| 7,098,894 B2 * | 8/2006 | Yang et al. | 345/166 |
| 7,109,979 B2 * | 9/2006 | Moyne et al. | 345/179 |
| 7,111,285 B2 * | 9/2006 | Smith et al. | 717/140 |
| 7,116,427 B2 * | 10/2006 | Baney et al. | 356/498 |
| 7,117,285 B2 * | 10/2006 | Ota | 710/265 |
| 7,149,832 B2 * | 12/2006 | Wieland et al. | 710/269 |
| 7,165,174 B1 * | 1/2007 | Ginter et al. | 713/153 |
| 7,225,165 B1 * | 5/2007 | Kyojima et al. | 705/59 |
| 7,305,710 B2 * | 12/2007 | Athens et al. | 726/26 |
| 7,356,709 B2 * | 4/2008 | Gunyakti et al. | 713/193 |
| 7,379,918 B2 * | 5/2008 | Tan et al. | 705/59 |
| 7,380,269 B2 * | 5/2008 | Zvi et al. | 726/2 |
| 7,458,100 B2 * | 11/2008 | Jascau et al. | 726/26 |
| 7,483,018 B2 * | 1/2009 | Oliver | 345/179 |
| 7,500,245 B2 * | 3/2009 | Ben-Zvi | 719/310 |
| 7,644,442 B2 * | 1/2010 | Miller et al. | 726/26 |
| 7,656,395 B2 * | 2/2010 | Pope et al. | 345/179 |
| 7,788,496 B2 * | 8/2010 | Lelikov et al. | 713/182 |
| 2001/0013025 A1 * | 8/2001 | Ananda | 705/60 |
| 2001/0034861 A1 * | 10/2001 | Kang | 714/52 |
| 2001/0035861 A1 * | 11/2001 | Ericson et al. | 345/179 |
| 2001/0052077 A1 * | 12/2001 | Fung et al. | 713/184 |
| 2001/0056539 A1 * | 12/2001 | Pavlin et al. | 713/193 |
| 2002/0005834 A1 * | 1/2002 | Oh | 345/163 |
| 2002/0006204 A1 * | 1/2002 | England et al. | 380/269 |
| 2002/0007456 A1 * | 1/2002 | Peinado et al. | 713/164 |
| 2002/0010863 A1 * | 1/2002 | Mankefors | 713/189 |
| 2002/0012432 A1 * | 1/2002 | England et al. | 380/231 |
| 2002/0013772 A1 * | 1/2002 | Peinado | 705/51 |
| 2002/0019887 A1 * | 2/2002 | Moore | 709/328 |
| 2002/0069172 A1 * | 6/2002 | Omshehe et al. | 705/51 |
| 2002/0099663 A1 * | 7/2002 | Yoshino et al. | 705/65 |
| 2002/0136407 A1 * | 9/2002 | Denning et al. | 380/258 |
| 2002/0138735 A1 * | 9/2002 | Felt et al. | 713/176 |
| 2002/0141582 A1 * | 10/2002 | Kocher et al. | 380/201 |
| 2002/0146121 A1 * | 10/2002 | Cohen | 380/201 |
| 2002/0169974 A1 * | 11/2002 | McKune | 713/200 |
| 2002/0174356 A1 * | 11/2002 | Padole et al. | 713/200 |
| 2003/0014655 A1 * | 1/2003 | England et al. | 713/200 |
| 2003/0028488 A1 * | 2/2003 | Mohammed et al. | 705/59 |
| 2003/0046238 A1 * | 3/2003 | Nonaka et al. | 705/51 |
| 2003/0078853 A1 * | 4/2003 | Peinado et al. | 705/26 |
| 2003/0081785 A1 * | 5/2003 | Boneh et al. | 380/277 |
| 2003/0084306 A1 * | 5/2003 | Abburi et al. | 713/188 |
| 2003/0093685 A1 * | 5/2003 | Tobin | 713/200 |
| 2003/0112220 A1 * | 6/2003 | Yang et al. | 345/156 |
| 2003/0145314 A1 * | 7/2003 | Nguyen et al. | 717/158 |
| 2003/0182431 A1 * | 9/2003 | Sturniolo et al. | 709/227 |
| 2003/0187801 A1 * | 10/2003 | Chase et al. | 705/59 |
| 2003/0194092 A1 * | 10/2003 | Parks et al. | 380/281 |
| 2003/0194094 A1 * | 10/2003 | Lampson et al. | 380/282 |
| 2003/0195855 A1 * | 10/2003 | Parks et al. | 705/51 |
| 2003/0217011 A1 * | 11/2003 | Peinado et al. | 705/59 |
| 2003/0233573 A1 * | 12/2003 | Phinney | 713/200 |
| 2003/0236956 A1 * | 12/2003 | Evans et al. | 713/164 |
| 2004/0001594 A1 * | 1/2004 | Krishnaswamy et al. | 380/277 |
| 2004/0003264 A1 * | 1/2004 | Zeman et al. | 713/190 |
| 2004/0027377 A1 * | 2/2004 | Hays et al. | 345/760 |
| 2004/0054930 A1 * | 3/2004 | Walker et al. | 713/202 |
| 2004/0088730 A1 * | 5/2004 | Gopalan et al. | 725/93 |
| 2004/0135776 A1 * | 7/2004 | Brouhon | 345/179 |
| 2004/0181772 A1 * | 9/2004 | Pensak et al. | 717/100 |
| 2004/0193545 A1 * | 9/2004 | Shlasky | 705/59 |
| 2005/0044191 A1 * | 2/2005 | Kamada et al. | 709/223 |
| 2005/0044367 A1 * | 2/2005 | Gasparini et al. | 713/172 |
| 2005/0060462 A1 * | 3/2005 | Ota | 710/260 |
| 2005/0074125 A1 * | 4/2005 | Chavanne et al. | 380/278 |
| 2005/0114683 A1 * | 5/2005 | Jin et al. | 713/187 |
| 2005/0132347 A1 * | 6/2005 | Harper et al. | 717/168 |
| 2005/0183072 A1 * | 8/2005 | Horning et al. | 717/140 |
| 2005/0216420 A1 * | 9/2005 | Padole et al. | 705/59 |
| 2005/0222960 A1 * | 10/2005 | Hatlelid | 705/59 |

| | | | | |
|---|---|---|---|---|
| 2005/0246286 | A1* | 11/2005 | Ebihara et al. | 705/59 |
| 2005/0251808 | A1* | 11/2005 | Gbadegesin et al. | 719/310 |
| 2006/0005251 | A1* | 1/2006 | Wu et al. | 726/26 |
| 2006/0026604 | A1* | 2/2006 | Tan et al. | 719/331 |
| 2006/0028442 | A1* | 2/2006 | Bynum et al. | 345/157 |
| 2006/0069653 | A1* | 3/2006 | Lelikov et al. | 705/59 |
| 2006/0106725 | A1* | 5/2006 | Finley et al. | 705/59 |
| 2006/0109262 | A1* | 5/2006 | Yeh | 345/179 |
| 2006/0112241 | A1* | 5/2006 | Weiss et al. | 711/154 |
| 2006/0123400 | A1* | 6/2006 | Burdick et al. | 717/130 |
| 2006/0173788 | A1* | 8/2006 | Nath Pandya et al. | 705/59 |
| 2006/0195906 | A1* | 8/2006 | Jin et al. | 726/26 |
| 2006/0242081 | A1* | 10/2006 | Ivanov et al. | 705/59 |
| 2007/0005504 | A1* | 1/2007 | Chen et al. | 705/59 |
| 2007/0074223 | A1* | 3/2007 | Lescouet et al. | 718/108 |
| 2007/0234430 | A1* | 10/2007 | Goldsmid et al. | 726/26 |

FOREIGN PATENT DOCUMENTS

| | | |
|---|---|---|
| EP | 0715247 A1 | 6/1996 |
| JP | 2006/011509 | 1/2006 |
| WO | WO 93/01550 A1 | 1/1993 |
| WO | WO 96/13013 A1 | 5/1996 |
| WO | WO 96/24092 A2 | 8/1996 |
| WO | WO 96/27155 A2 | 9/1996 |
| WO | WO 97/25798 A1 | 7/1997 |
| WO | WO 97/43761 A2 | 11/1997 |
| WO | WO 98/09209 A1 | 3/1998 |
| WO | WO 98/10381 A1 | 3/1998 |
| WO | WO 98/21679 A1 | 5/1998 |
| WO | WO 98/24037 A2 | 6/1998 |
| WO | WO 98/37481 A1 | 8/1998 |
| WO | WO 00/15221 A1 | 3/2000 |
| WO | WO 00/59150 A2 | 10/2000 |
| WO | WO 00/58811 A3 | 9/2002 |
| WO | WO 2004/019182 A2 | 3/2004 |
| WO | WO 2004/092933 A1 | 10/2004 |
| WO | WO 2006/085103 A1 | 8/2006 |

OTHER PUBLICATIONS

"Black Box Crypton Defies the Hackers", Electronics Weekly, Mar. 6, 1985, p. 26.
"IBM Spearheading Intellectual Property Protection Technology for Information on the Internet", May 1996, 3 pages.
"Licenslt: kinder,gentler copyright? Copyright management system links content, authorship information", Seybold Report on Desktop Publishing, 1996, 10(11), 2 pages.
"portion", Collins English Dictionary, London: Collins, 2000, Credo Reference [online], www.credoreference.com-entry-hcengdict-portion, retrieved Jun. 6, 2009.
"Rights Management in the Digital Age: Trading in Bits, Not Atoms", Spring, 1997, 4, 3 pages.
"Solution for piracy", Which Computer, 1983, p. 29 (from DialogClassic WebTM file 275, Accession No. 01 0 14280).
"Aladdin Acquires the Assets of Micro Macro Technologies", Business Wire, Mar. 3, 1999, 2 pages.
"All About Activation of Adobe Software", www.adobe.com-activation-main.html, accessed Jun. 24, 2004, 5 pages.
"BreakerTech Joins Copyright Management Market", Computergram International, Aug. 5, 1999, 2 pages.
"Sony Develops Copyright Protection Solutions for Digital Music Content", PR Newswire, Feb. 25, 1999, 4 pages.
"Technological Solutions Rise to Complement Law's Small Stick Guarding Electronic Works", Information Law Alert, Jun. 16, 1995, 3-4 and 7.
Armati, "Tools and standards for protection, control and presentation of data", Apr. 3, 1996, 17 pages.
Benjamin et al., "Electronic markets and virtual value chains on the information superhighway", Sloan Management Rev., Winter, 1995, 62-72.
Cappaert, J. et al., "Self-Encrypting Code to Protect Against Analysis and Tampering," in First Benelux Workshop on Information and System Security, Nov. 8-9, 2006, see http://www.cosic.esat.kuleuven.be/wissec2006/papers/3.pdf, 14 pages.
Cassidy, "A Web developers guide to content encapsulation technology", Apr. 1997, 5 pages.
Cox, "Superdistribution", Idees Fortes, Sep. 1994, 2 pages.
Cox, "What if There Is a Silver Bullet", J. Object Oriented Program, Jun. 1992, 8-9 and 76.
Gold, "Finland—Data Fellows Secures ICSA Certification", Newsbytes, Jan. 7, 1998, 1 page.
Griffiths, A.L., 2005. Binary protection schemes. RECON2005 Conference, Jun. 2005., 91 pages.
Griswold, "A Method for Protecting Copyright on Networks", IMA Intell. Property Project Proceedings, Jan. 1994, 1(1), 169-178.
Hauser, "Does Licensing Require New Access Control Techniques?", Conference on Computer and Communications Security, Aug. 3, 1993, 9 pages.
Hudgins-Bonafield, "Selling Knowledge on the Net", Network Computing, Jun. 1, 1995, 102-109.
In the United States Patent and Trademark Office, Final Office Action, in re:. U.S. Appl. No. 10/681,017, filed Oct. 8, 2003, Dated Nov. 26, 2007, 13 pages.
In the United States Patent and Trademark Office, Final Office Action, in re:. U.S. Appl. No. 11/139,947, filed May 27, 2005, Dated Jun. 12, 2009, 14 pages.
In the United States Patent and Trademark Office, Final Office Action, in re:. U.S. Appl. No. 11/273,775, filed Nov. 14, 2005, Dated Jun. 19, 2008, 15 pages.
In the United States Patent and Trademark Office, Final Office Action, in re:. U.S. Appl. No. 11/273,775, filed Nov. 14, 2005, Dated Nov. 28, 2007, 14 pages.
In the United States Patent and Trademark Office, Non-Final Office Action, in re:. U.S. Appl. No. 10/681,017, filed Oct. 8, 2003, Dated May 30, 2007, 13 pages.
In the United States Patent and Trademark Office, Non-Final Office Action, in re:. U.S. Appl. No. 11/404,448, filed Apr. 14, 2006, Dated Sep. 21, 2007, 13 pages.
In the United States Patent and Trademark office, Non-Final Office Action in related U.S. Appl. No. 11/095,297, filed Mar. 30, 2005, dated Nov. 6, 2008, 16 pages.
In the United States Patent and Trademark Office, Non-Final Office Action, in re:. U.S. Appl. No. 10/681,017, filed Oct. 8, 2003 Dated May 30, 2007, 13 pages.
In the United States Patent and Trademark Office, Non-Final Office Action, in re:. U.S. Appl. No. 11/139,947, filed May 27, 2005, Dated Dec. 10, 2008, 14 pages.
In the United States Patent and Trademark Office, Non-Final Office Action, in re:. U.S. Appl. No. 11/139,947, filed May 27, 2005, Dated Nov. 19, 2009, 8 pages..
In the United States Patent and Trademark Office, Notice of Allowance and Fee(s) Due, in re:. U.S. Appl. No. 11/404,448, filed Apr. 14, 2006, Dated Mar. 20, 2008, 13 pages.
In the United States Patent and Trademark Office, Notice of Allowance and Fee(s) Due, in re:. U.S. Appl. No. 10/681,017, filed Oct. 8, 2003, Dated Jun. 25, 2008, 9 pages.
Kahn, "Deposit, Registration and Recordation in an electronic copyright management system", IM Intellectual Property Project Proceedings, 1994, 1(1), 111-120.
Kaplan, "IBM Cryptolopes_, Super-Distribution and Digital Rights Management", Dec. 1996, 7 pages.
Kent, "Protecting externally supplied software in small computers", Sep. 1980, 1-42 and 250-252.
Kohl et al., "Safeguarding Digital Library Contents and Users; Protecting Documents Rather Than Channels", D-Lib Magazine, Sep. 1997, 9 pages.
Linn, "Copyright and Information Services in the Context of the National Research and Education Network", IMA Intell. Property Project Proceedings, Jan. 1994, 1(1), 1 and 10-20.
Main, A. et al., "Software Protection and Application Security: Understanding the Battleground", State of the Art and Evolution of Computer Security and Industrial Cryptography, Jun. 2003, 19 pages, http://www.scs.carleton.ca.
McNab, "Super-Distribution works better in practical applications", Mar. 2, 1998, 2 pages.
Microsoft Partner Program, "Product Activation", www.members.microsoft.com-partner-salesmarket-pack-activatin.aspx, accessed Jun. 24, 2004, 4 pages.

Moeller, "IBM takes charge of E-commerce; Plans client, server apps based on SET", Apr. 1996, 4 pages.

Moeller, "NetTrust lets Cyberspace Merchants Take Account", PC Week, Nov. 20, 1995, 12(48), 1 page.

Olson et al., "Concurrent Access Licensing", Software Licensing, 1988, 6(9), 67-72.

Pemberton, "An Online Interview with Jeff Crigler at IBM InfoMarket", Jul. 1996, 7 pages.

Ramanujapuram et al., "Digital Content & Intellectual Property Rights: A specficiation language and tools for rights management", Dec. 1998, 20-23 and 26.

Sibert et al., "Securing the Content, Not the Wire, for Information Commerce", Jul. 1995, 1-11.

Sibert et al., "The DigiBox: A Self-protecting Container for Information Commerce", First USENIX Workshop on Electronic Commerce, Jul. 11-12, 1995, 171-183.

Stefik, "Shifting the Possible: How Trusted Systems and Digital Property Rights Challenge Us to Rethink Digital Publishing", Technical Perspective, 1997, 137-159.

Stefik, "Trusted Systems", Mar. 1997, 8 pages.

St-Michel et al., "Autoplay in Windows XP: Automatically Detect and React to New Devices on a System", MSDN Magazine, Nov. 2001, 16(11), 12 pages.

Sun Microsystems, Users Guide Wireless Toolkit, Version 2.1, Java Platform Micro Edition, Dec. 2003, 1-89.

Thompson, "Digital Licensing", Architectural Perspectives, IEEE Computer Society, Jul.-Aug. 2005, 9(4), 4 pages.

Tulloch, M., "Windows 2000 Administration in a Nutshell," Feb. 16, 2001, O'Reilly Media, 4 pages.

U.S. Appl. No. 10/681,017: Non Final Rejection, Mar. 16, 2009, 8 pages.

U.S. Appl. No. 10/681,017: Non Final Rejection, Oct. 5, 2009, 7 pages.

U.S. Appl. No. 10/681,017: Notice of Allowance, Apr. 2, 2010, 16 pages.

U.S. Appl. No. 10/681,017: Notice of Allowance, Dec. 30, 2008, 10 pages.

Using USB Flash Drives at SUNY/Cortland, Instructions for Windows XP/2000, Dec. 12, 2004, Academic Computing Liaisons, 8 pages.

Weber, "Digital Rights Management Technology", Oct. 1995, 1-49.

White et al., "ABYSS: A trusted architecture for software protection", IEEE Symposium on Security and Privacy, Apr. 27-29, 1987, 38-51.

White et al., "ABYSS: An Architecture for Software Protection", IEEE Trans. on Software Engineering, Jun. 1990, 16(6), 619-629.

Zhang et al., "Hiding Program Slices for Software Security", CGO '03, Proceedings of the International Symposium on Code Generation and Optimization: Feedback-Directed and Runtime Optimization, San Francisco, California, USA, Mar. 23-26, 2003, 325-336.

\* cited by examiner

FIRST COMPUTER PROCESS AND SECOND COMPUTER PROCESS PROXY-EXECUTING CODE ON BEHALF OF FIRST PROCESS

CROSS-REFERENCE TO RELATED APPLICATION

The present application is a divisional of prior application Ser. No. 11/273,775, filed Nov. 14, 2005, which is, in turn, a continuation-in-part of prior application Ser. No. 10/681,017, filed Oct. 8, 2003. The content of these applications are hereby incorporated by reference in their entireties.

TECHNICAL FIELD

This invention relates to a first process on a computing device and a second process on the computing device that executes code on behalf of and as a proxy for such first process. More particularly, the invention relates to a security process on the computing that proxy-executes the code on behalf of an application process only if the security process is satisfied based on a license or the like that the application process is entitled to be operating on the computing device. Even more particularly, the invention relates to such a security process that proxy-executes code on behalf of the application process to execute a function limited by the license to a defined count, but only if the security process is satisfied based on maintained state regarding the count that the application process is entitled to execute the function.

BACKGROUND OF THE INVENTION

A computer application distributor wishes to distribute such computer application to each of many users or recipients in exchange for a license fee or some other consideration. However, such distributor typically also wishes to restrict what each user or recipient can do with such distributed computer application. For example, the distributor would like to restrict the user from copying and re-distributing such application to a second user, at least in a manner that denies the distributor a license fee from such second user. Similarly, the distributor may wish to prevent the user from employing the application to perform more than a set number of a certain task.

In addition, the distributor may wish to provide the user with the flexibility to purchase different types of use licenses at different license fees, while at the same time holding the user to the terms of whatever type of license is in fact purchased. For example, the distributor may wish to allow the application to be executed only a limited number of times, only for a certain total time, only on a certain type of machine, only on a certain type of rendering platform, only by a certain type of user, etc. Likewise, the distributor may wish to allow one user to pay a smaller license fee and access a smaller set of application functions and also to allow another user to pay a larger license fee and access a larger set of application functions, and the like.

However, after distribution has occurred, such distributor has very little if any control over the distributed application. This is especially problematic in view of the fact that the application may be copied and re-distributed to most any personal computer, presuming that the application is not otherwise protected in some manner from such copying and re-distribution. As should be appreciated, most any such personal computer includes the software and hardware necessary to make an exact digital copy of such application, and to download such exact digital copy to a write-able magnetic or optical disk, or to send such exact digital copy over a network such as the Internet to any destination.

Of course, as part of a transaction wherein the application is distributed, the distributor may require the user/recipient of the application to promise not to re-distribute such application in an unwelcome manner, and to not perform other prohibited acts. However, such a promise is easily made and easily broken. A distributor may therefore attempt to prevent such prohibited acts through any of several known security measures.

One security measure that is employed to prevent improper re-distribution of an application is product activation. In such product activation, a customer acquiring a software application is provided with a product activation key corresponding thereto, which is a unique serial number and product identifier that acts as a proof of purchase or the like. The provided product key is then entered during installation of the application on a particular computer device to act as a proffer that the application was acquired legally and/or otherwise properly. The product activation key need not be and typically is not cryptographic in nature, although a digital signature (which is cryptographic in nature) may be included to act as a guarantee that the product key is genuine.

The entered product key and an ID representative of the computer device are then sent to a product activation service as part of the installation process. As may be appreciated, the product activation service determines whether the entered product key is valid, whether the product key has been employed before, and if so in connection with what computer device. Typically, each product key enables an installation or re-installation of the application on a single computing device, as is set forth in a corresponding license agreement, although a product key may also enable a set number of installations/re-installations on multiple computer devices also.

Accordingly, if the product activation service determines that the entered product key has already been employed to install the application on another computer device (or has been employed a maximum number of times, for example), such activation service will not allow the installation of the application on the computer device to proceed, will not allow a complete installation of the application on the computer device, will not allow the installed application to be used on the computer device, or the like, as the case maybe. Thus, activation as used herein may entail permission to install the application, permission to perform some level of installation of the application, permission to completely install the application, some level of permission to use the application, complete permission to use the application, or the like.

If the activation service declines to activate the application for the customer based on an entered product key already being used in connection with another computing device, or based on the entered product key not supporting the level of activation desired, the customer must acquire another appropriate product key to install/completely install/use the application on the computing device in the manner desired. Thus, the product key and the product activation service act to ensure that the application is not nefariously or wantonly installed/activated/used on multiple computing devices, such as may be in violation of any software license agreement associated with the software product.

Note that as part of the activation process, the activation service may return a digital version of the license to the computing device on which the application is associated. Such license may be tied to the computing device such that the license is not usable with any other computing device, and may express a level of activation, as well as license terms such as application functions that are to be made available, functions that are to be made non-available, a period of activation or a number of times the application may be executed on the computing device, a maximum number of uses of a particular function of the application, a maximum number of simultaneous uses of a particular function of the application, and the like. In general, such license may express any limitations and/or rights and also may express any policies that should be honored in connection with the execution of the application on the computing device, all as set forth by the distributor of the application or another entity.

With such license, then, a rights client controller with a license evaluator or the like may be employed on the computer along with the distributed application to control operation and use of the application based on an evaluation of whether the license so permits. However, a need exists for an actual method and mechanism by which such rights client with such license evaluator may in fact control operation and use of the application based on the license. In particular, a need exists for such a rights client with such a license evaluator that executes certain portions of code on behalf of and as a proxy for the application, but only if the license evaluator determines that the license allows such execution.

While in one case the portions of code within the application are at least partially randomly chosen, it is to be appreciated that in another case each of at least some of the portions of code represents a function that is to be executed only if the corresponding license so allows. More specifically, the function is to be executed only if the corresponding license so allows based on a logical or mathematical determination. For instance, it may be that the function allows the instantiation of a resource, and the license allows a maximum of X instantiations of the resource. In such an instance, then, a need exists for a method and mechanism by which a secure process can securely maintain a count of the number of instantiations of the resource as state information. More generally, a need exists for a method and mechanism by which the secure process can securely maintain state information regarding data necessary to determine whether a license for an application allows code of the application to be executed.

SUMMARY OF THE INVENTION

The aforementioned needs are satisfied at least in part by the present invention in which a computer has a first process with code to be executed in connection therewith, where the code includes a triggering device. A digital license corresponds to the first process and sets forth terms and conditions for operating the first process. A second process operates on the computer for proxy-executing code corresponding to the triggering device of the first process on behalf of such first process, the second process including a license evaluator for evaluating the license upon the first process encountering the triggering device to determine whether the first process is to be operated in accordance with the terms and conditions set forth in such license.

The second process upon the first process encountering the triggering device chooses whether to in fact proxy-execute code corresponding to the triggering device of the first process on behalf of such first process based at least in part on whether the license evaluator has determined that the first process is to be operated in accordance with the terms and conditions of the license. The license evaluator at least in part performs such determination by running a script corresponding to the triggering device in the code of the first process. Thus, the first process is dependent upon the second process and the license for operation thereof.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
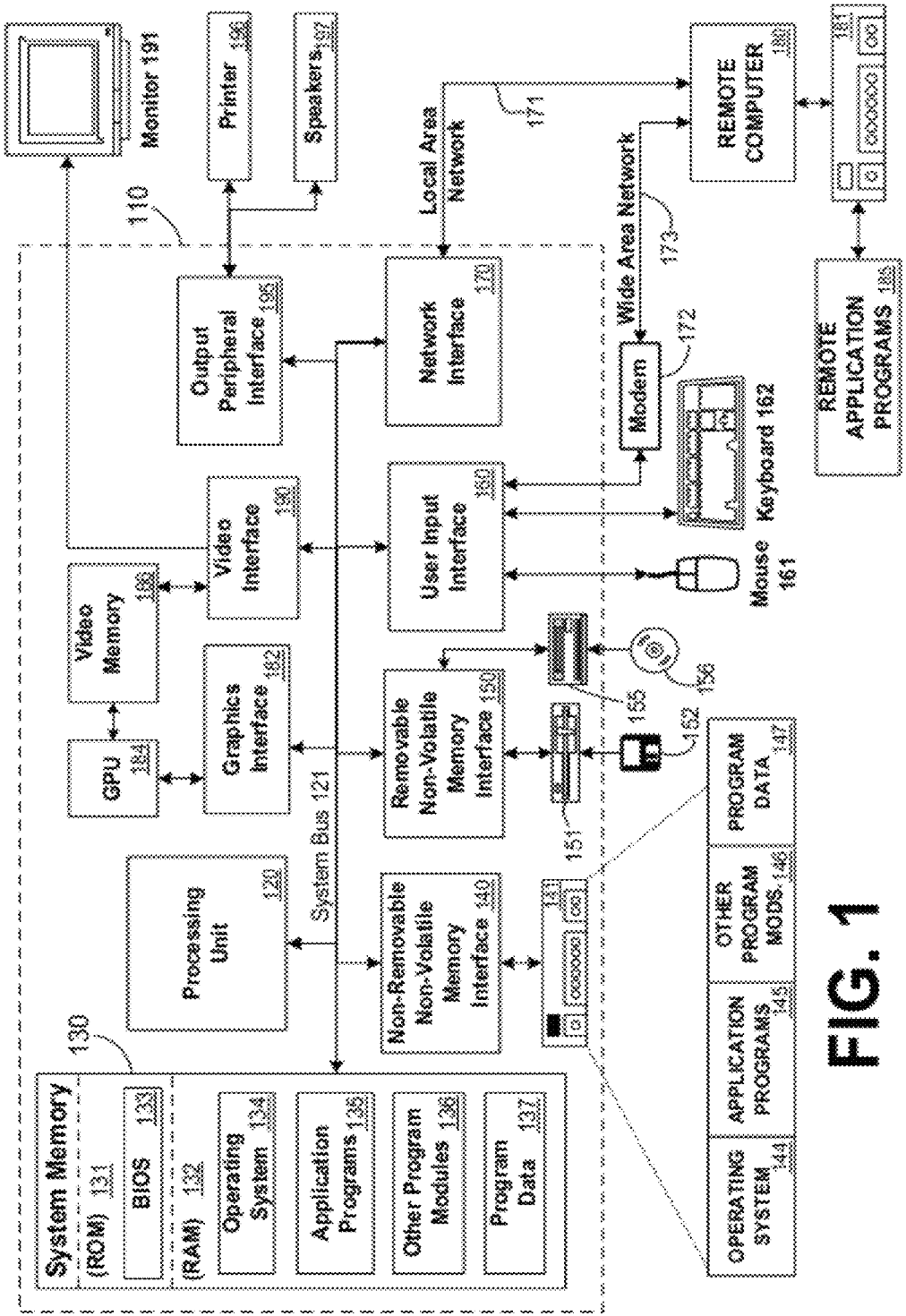
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
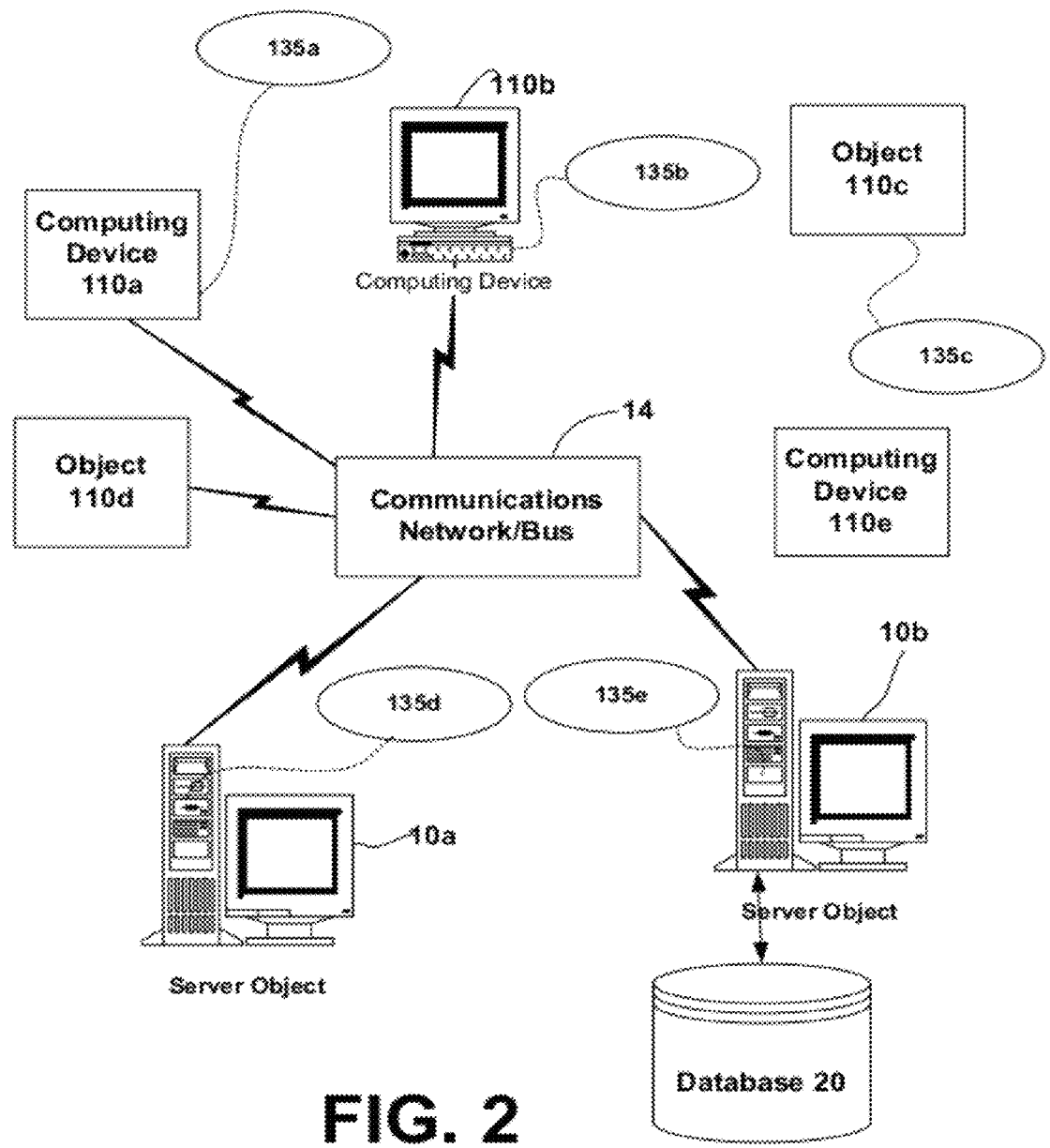
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each objector 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Proxy Execution of Code

In the present invention, a rights client with a license evaluator and in connection with a product activation service controls operation and use of an application based on a corresponding license by executing code on behalf of and as a proxy for an application, but only if the license evaluator determines that the license allows such execution. Thus, the rights client with the license evaluator enforces the license as against a user of the application.

As may be appreciated, although the present invention is disclosed primarily in terms of the rights client with the license evaluator, the application, the license, and the product activation service, such present invention may also be employed in connection with alternate elements without departing from the spirit and scope of the present invention. For example, the application may instead be any application or type of process running on a computer, including a program, an operating system, and the like, or even a piece of digital content such as an audio recording or multimedia presentation. Similarly, the license may instead be any sort of permission token, with or without specific permission parameters, and the license evaluator may instead be any kind of device for evaluating such a permission token. Likewise, the product activation service may instead be any variety of permission-granting authority, and the rights client may instead be any variety of controlling authority that can also proxy-execute code. Accordingly, and more generally, in the present invention, a second process on a computer controls the operation and use of a first process on a computer by executing code on behalf of and as a proxy for the first process.

Figure 3:
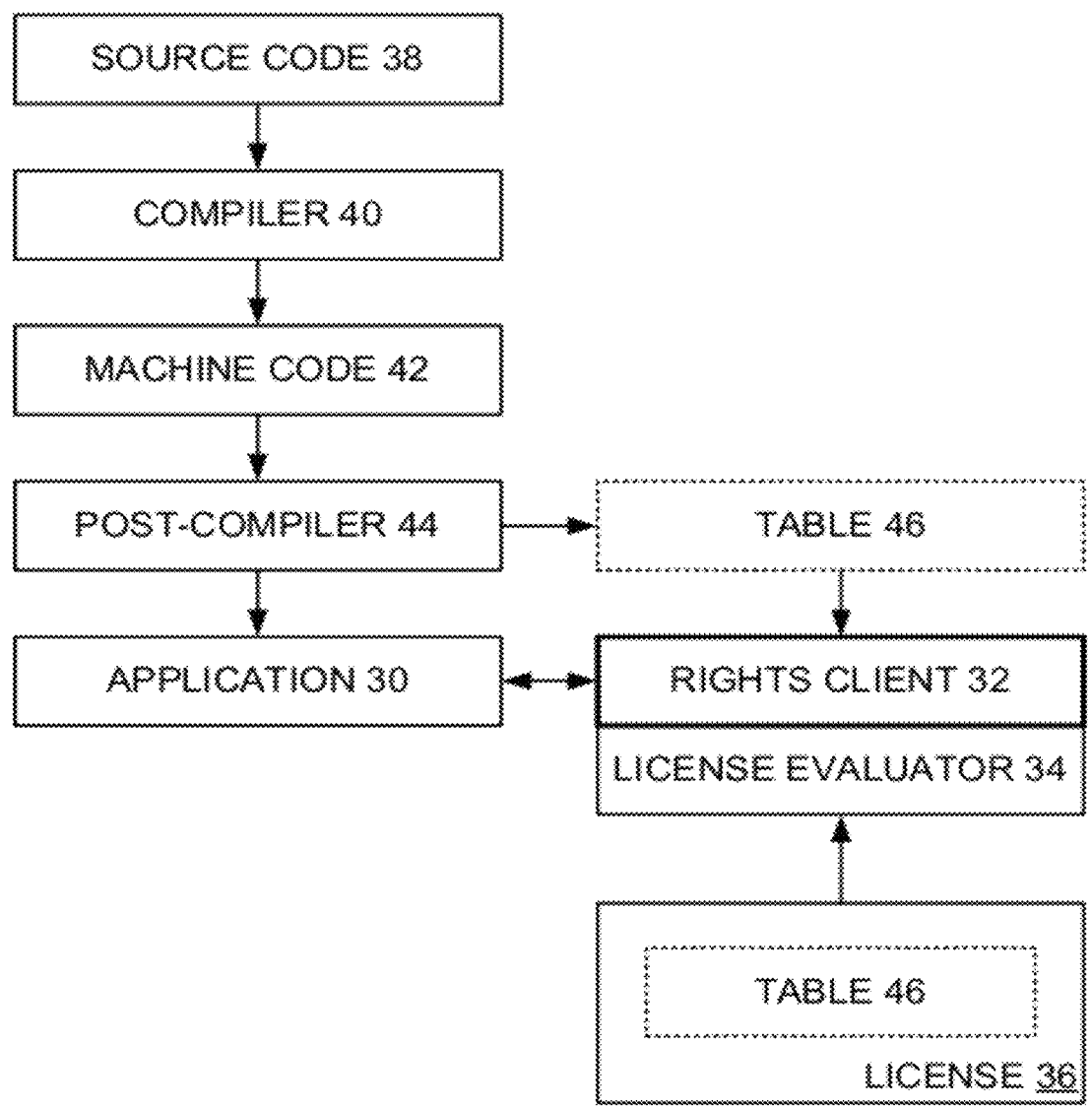
FIG. 3 is a block diagram showing a first computer process, a second computer process proxy-executing code on behalf of the computer process, and related elements in accordance with one embodiment of the present invention.

Turning now to FIG. 3, it is seen that in one embodiment of the present invention, a first process such as an application 30 is dependent upon a second, secure process such as a rights client 32 to proxy execute at least some portion of code for the application 30, where the rights client 32 includes a license evaluator 34 or the like. Accordingly, the rights client 32 may choose whether to in fact proxy execute the code for the application 30 based, among other things, on whether the license evaluator 34 has access to a license 36 corresponding to the application 30, and on whether the license 36 has permissions or rights that allow or at least do not prohibit the action corresponding to the code to be executed. Note that such a license 36 and the license evaluation 34 of the rights client 32 are known or should be apparent to the relevant public and therefore need not be disclosed herein in any detail.

Figure 4:
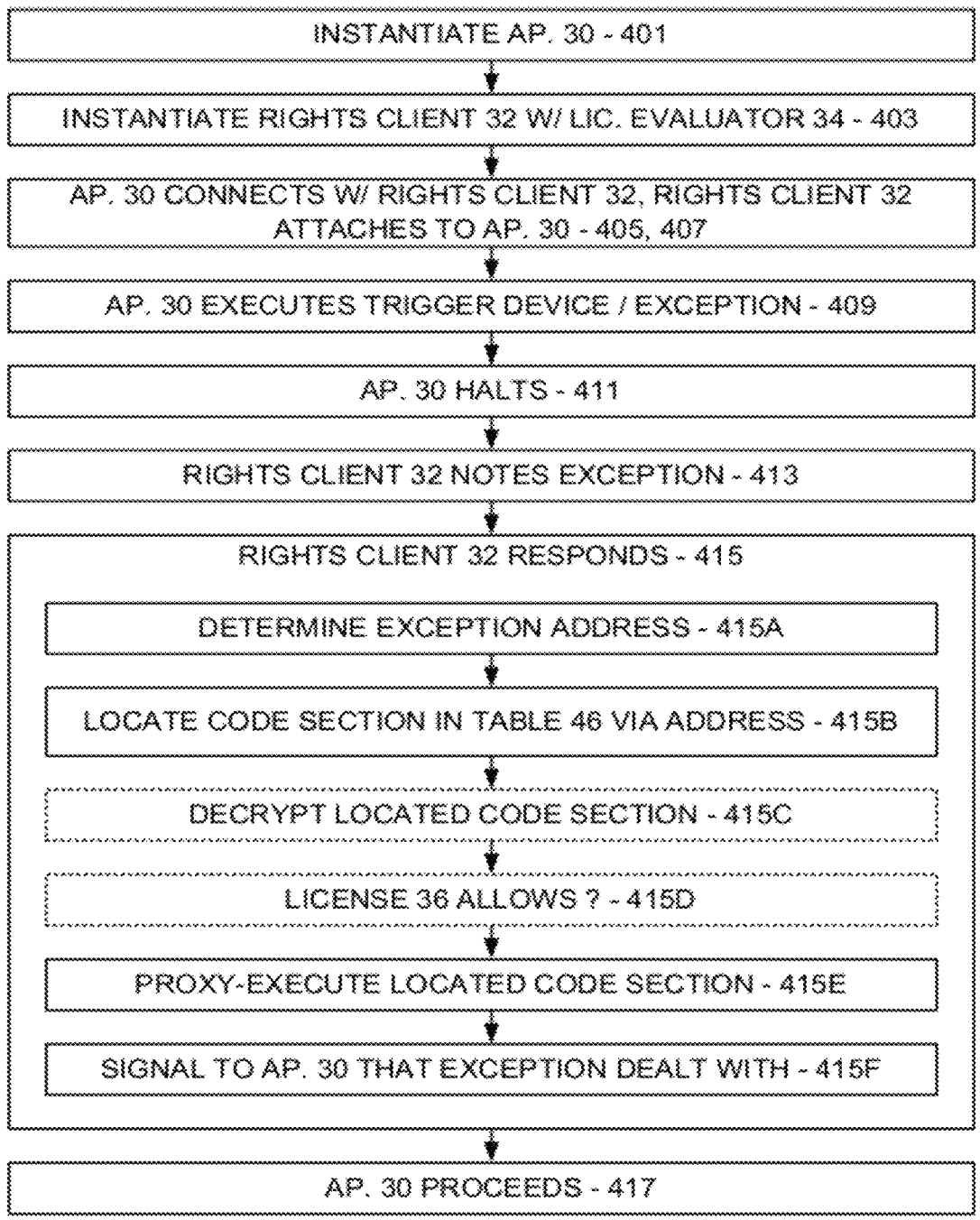
FIG. 4 is a flow diagram showing key steps performed in connection with the first and second processes of FIG. 3 to proxy-execute code in accordance with one embodiment of the present invention.

In one embodiment of the present invention, and referring now to FIG. 4, the application 30, rights client 32, and license evaluator 34 are constructed to operate on a computer 110 (FIG. 1) or the like as follows. Typically, either a user or another process on the computer 110 instantiates the application 30 on such computer 110 as the aforementioned first process (step 401), and as part of an initializing process such application 30 ensures that the rights client 32 with the license evaluator 34 (hereinafter, 'rights client 32') is instantiated on the computer 110 as the aforementioned second process (step 403). Thereafter, the application 30 establishes a connection with the rights client 32 (step 405). Note that it may be the case that the rights client 32 is already instantiated or it may be the case the rights client 32 must be newly instantiated, either by the application 30, another process, the user, or the like.

Once step 405 is performed, and presuming that a license 36 corresponding to the application 30 is available to the rights client 32 and the license evaluator 34 thereof, the application 30 can query the rights client 32 to have the license evaluator 34 thereof determine based on the license 36 the rights the application 30 has based on such license 36, and the application 36 can then operate based on such rights. However, it is to be appreciated that a nefarious entity wishing to subvert the license 36 might choose to attack the application 30 by re-directing the query to a stub rights client that would in effect grant all rights to the application 30 without regard to any license 36, present or otherwise. Alternatively, such a nefarious entity might choose to spoof communications between the application 30 and the rights client 32 or may wish to attack the rights client 32 itself if the application 30 cannot be attacked. Note, though, that the latter case is less likely inasmuch as the rights client 32 should be highly secure and protected from such an attack.

Accordingly, and in one embodiment of the present invention, the rights client 32 is required to proxy-execute at least some portions of code on behalf of the application 30 so that the application is dependent on the rights client 32. Put another way, by requiring the rights client 32 to proxy-execute at least some portion of code on behalf of the application 30, the aforementioned nefarious entity cannot subvert the license 36 by somehow removing the rights client 32 from participating in the method of FIG. 4. Instead, the rights client 32 must participate to proxy-execute code on behalf of the application 30, and while doing so the license evaluator 34 of the rights client 32 can also perform evaluation functions with regard to the license 36. Thus the rights client 32 does not merely provide the application 30 with a true or false type of response that could be spoofed.

In one embodiment of the present invention, the license 36 includes encoded information regarding the code that the rights client 32 is to proxy-execute. Thus, the license 36 must be available to the rights client 32 for same to proxy-execute on behalf of the application 30. For example, the encoded information may include the code, a reference to a location of the code, a decryption key for decrypting an encrypted version of the code, or the like.

Figure 5:
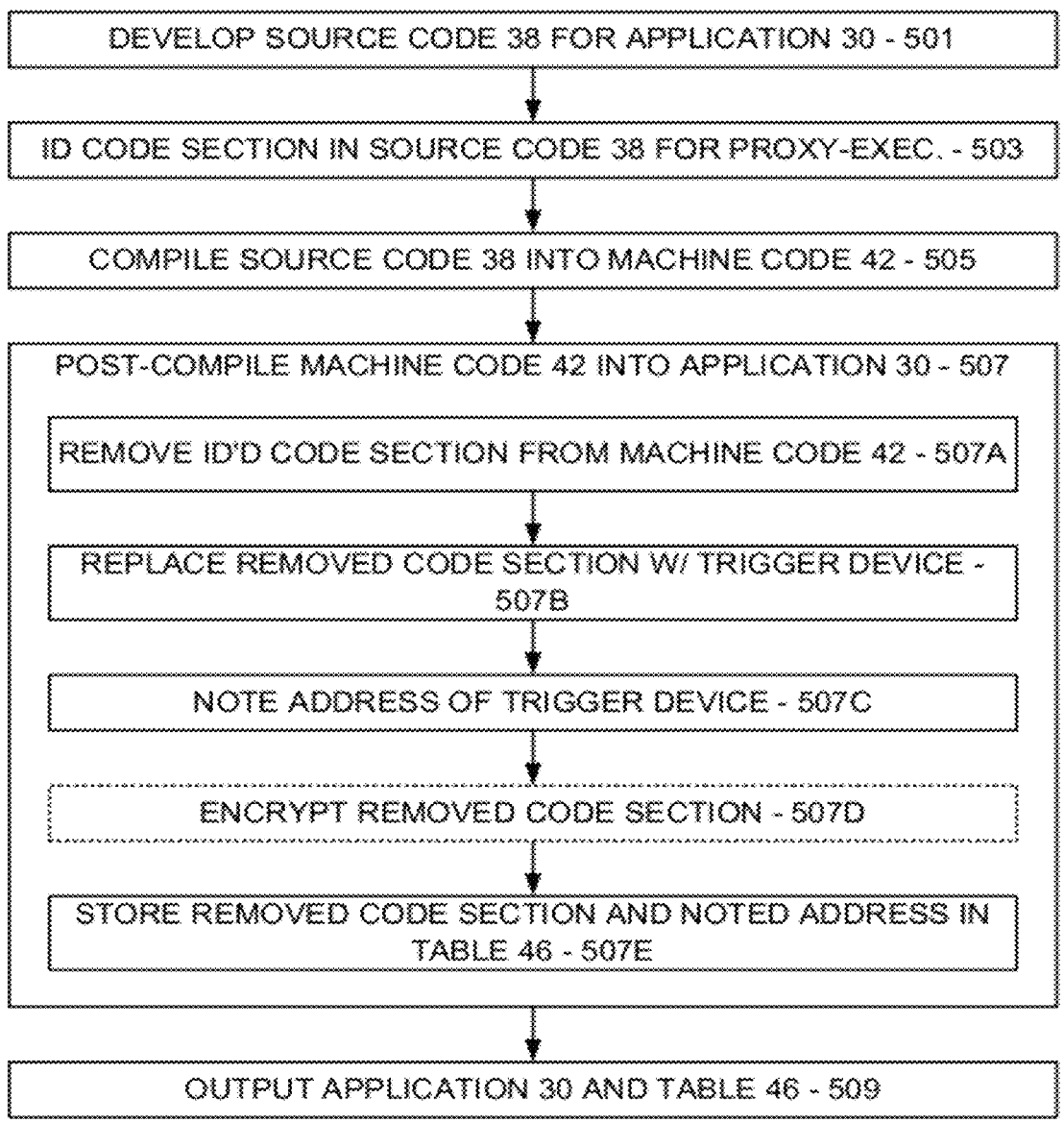
FIG. 5 is a flow diagram showing key steps performed to develop the first process of FIG. 3 in accordance with one embodiment of the present invention.

As should now be appreciated, in order to effectuate proxy-execution, the application 30 must be pre-processed to define the code that is to be proxy-executed, to remove same from such application 30, and to appropriately store such removed code in a form proxy-executable by the rights client 32. In one embodiment of the present invention, then, and turning now to FIG. 5, a method of pre-processing the application 30 to effectuate proxy-execution is shown.

Preliminarily, and as may be appreciated, a developer develops source code 38 (FIG. 3) for the application 30 in an appropriate programming language, such as for example a C-type programming language (step 501). In doing so, and significantly, the developer identifies within such source code 38 for the application 30 each of one or more code sections that is to be proxy-executed (step 503). As may be appreciated, each such proxy-executed code section identification may comprise any appropriate mark, tag, command, or the like without departing from the spirit and scope of the present invention. Thereafter, the developer compiles the source code 38 with a compiler 40 into machine code 42 (step 505).

Note that the developer may identify each code section within the source code 38 based on any particular criteria without departing from the spirit and scope of the present invention. For example, if the developer merely wishes to trigger proxy-execution from time to time so as to ensure the rights client 32 is present and is allowing the application 30 to operate based on a corresponding license 36, each such identified code section may be decided upon in a fairly random manner. However, if the developer wishes to trigger proxy-execution at specific times and/or with regard to specific sections of code, each such identified code section must be decided upon in a more targeted manner. Note with regard to the latter that it may be the case that an identified code section specifies a particular license right. In such a situation, it may also be the case that the rights client 32 will proxy-execute such identified code section only if the specified license right in the license 36 is met.

As may be appreciated, the compiler 40 may be any appropriate compiler without departing from the spirit and scope of the present invention. Significantly, the compiler 40 is constructed to maintain each code section identification in the machine code 42 so that post-compile processing may be performed on the code section identified thereby. Such maintaining may be performed in any appropriate manner without departing from the spirit and scope of the present invention. For example, the compiler 40 may pass the identification from the source code 38 to the machine code 42 in a recognizable form, or may create a scratch table (not shown) with such information therein.

Thus, and in one embodiment of the present invention, after such compiling, the developer post-compiles the machine code 42 with each recognizable code section identification therein with a post-compiler 44 into the final code representative of the application 30, where the post-compiler 44 converts each identified code section into a form accessible only by the rights client 32 and not by the application 30, such as for example by removing each identified code section in the machine code 42 from such application 30 or otherwise makes such identified code section inaccessible (step 507). As may be appreciated, such post-compiler 44 is constructed to retrieve each code section identification, either from the machine code 42, the aforementioned scratch table, or elsewhere, and operate based thereon.

In one embodiment of the present invention, for each identified code section in the machine code 42, the post-compiler 44 removes the identified code section from the machine code 42 (step 507*a*), replaces the removed code section with a triggering device (step 507*b*), notes an address of the triggering device within the application 30 (step 507*c*), and stores the removed code section and the noted address in a table 46 (FIG. 3) or the like (step 507*e*). If necessary or advisable, each removed code section may be stored in the table 46 in an encrypted form decryptable by the rights client 32 (step 507*d*). As was set forth above, such table 46 may be made available to the rights client 32 by being set forth in the license 36, or by being set forth in another location. Note that the table 46 may be signed or otherwise protected from alteration by a verifying device such as a hash.

As may be appreciated, by replacing the removed code section with the triggering device, and presuming that the triggering device is shorter than the removed code section, the post-compiler 44 shortens the machine code 42. Note that the triggering device may be any appropriate triggering device without departing from the spirit and scope of the present invention, as long as the triggering device is recognizable as a signal that the rights client 32 is needed to proxy-execute the corresponding removed code section. For example, the triggering device may be a particular exception that would get the attention of the rights client 32.

After the post-compiler 44 is finished, and as should now be appreciated, such post-compiler 44 outputs final code representative of the application 30 (hereinafter, 'the application 30') and the table 46 (step 509). As was set forth above, such table 46 may be made available to the rights client 32 by being set forth in the license 36, or by being set forth in another location separate from the application 30. It may for example be the case that the table 46 with encrypted removed code sections therein is placed in the license 36 along with a decryption key for decrypting each encrypted code section, where the decryption key is itself encrypted in a manner decryptable by the rights client 32.

Note that by separating the table 46 from the application 30, the application 30 has no innate access to the table 46 or the removed code sections therein. Nevertheless, in one embodiment of the present invention, the table 46 may indeed be set forth within the application 30 as a portion thereof. Note, too, that as an alternative to the code sections being removed from the application and set forth in the table 46, such code sections may instead be placed elsewhere. For example, such code sections may be placed within the application 30, either in a specifically dedicated portion thereof, or even at the respective locations where such code sections were originally found. Of course, in the latter case, such 'removed' code sections are not in fact removed, and accordingly should at least be encrypted or otherwise made unavailable without the license 36 and the rights client 32.

Thus, and returning now to FIG. 4, during runtime, and after the application 30 and rights client 32 have been instantiated, the rights client 32 attaches itself to the application 30 in the manner of a debugger or the like so that the rights client 32 can monitor the application 30 for when each triggering device/exception therein is executed (step 407). As may be appreciated, the rights client 32 monitors the application 30 for the particular triggering device/exception (hereinafter, 'exception') that signals that the rights client 32 is to proxy-execute on behalf of the application 30. Thus, on every breakpoint exception, the rights client 32 determines whether the exception source is a code section to be proxy-executed, and if so the rights client 32 proxy-executes such code section, presuming the license 36 so allows.

In an alternate embodiment of the present invention, the rights client 32 does not attach itself to the application 30 to monitor for an exception, but instead receives the exception from an operating system operating the computer 110. However, such an arrangement is indirect and therefore slower. Another alternative would be to have each triggering device be a call to the rights client 32, although such a strategy is slightly more complex as compared to an exception and is more prone to attack by a nefarious entity.

At some point, the application 30 may explicitly request permission to operate from the rights client 32 based on the license 36. In response, the rights client 32 searches for the license 36, the license evaluator 34 evaluates such license 36, and the rights client 32 returns such requested permission if the evaluation of the license evaluator 34 is positive. Note, though, that such explicit request for permission and response are ancillary to the present invention. Rather, in the present invention, the rights client 32 is actuated based on an exception or the like from the application 30 and not based on an explicit request from the application 30. Thus, in the present invention, the rights client 32 can withhold performance of a function on behalf of the application 30 even when the application 30 never requested permission to perform such function.

At any rate, in the course of operating, the application 30 at some point executes an exception in the code thereof, where such exception was placed in the application 30 by the post-compiler 44 in place of a 'removed' code portion (hereinafter, 'removed code portion') (step 409). As should be understood, upon executing the exception, the application 30 pauses or otherwise halts until receiving notice that the exception has been dealt with (step 411). Inasmuch as the rights client 32 is attached to the operating application 30 and is listening for such exception from such application 30, such rights client 32 notes the exception (step 413) and responds thereto (step 415).

In particular, to respond to the exception, the rights client first determines the address of the exception within the application 30 (step 415a), locates the corresponding code section in or by way of the table 46 based on such address (step 415b), proxy-executes such corresponding code section on behalf of the application 30 (step 415e), and then signals to the application 30 that the exception has been dealt with (step 415f). As may be appreciated, the application 30 may then proceed (step 417). Note that if the corresponding code section is encrypted, the rights client 32 must decrypt the located corresponding code section before proxy-executing same (step 415c). Note, too, that a particular code section may require that the license evaluator 34 of the rights client 32 first verify that the license 36 grants the rights necessary to proxy-execute such code section on behalf of the application 30 (step 415d). As may be appreciated, the rights client 32 proxy-executes such code section only if the license grants the right to do so. Otherwise, the rights client 32 declines to do so. In the latter case, it may be that the rights client 32 returns an appropriate message to the application 30.

It is to be appreciated that a rights client 32 should not be proxy-executing any arbitrary code section, especially inasmuch as the rights client 32 should be especially secure and therefore could have a relatively large amount of operating rights with respect to the computer 110. Put another way, the rights client 32 should not be performing actions that the application 30 would not have operating rights to perform, such as altering certain system registers, accessing memory areas of other applications and the operating system, and the like. Accordingly, in one embodiment of the present invention, the post-compiler 44 during operation thereof ensures that each code section removed and stored thereby is not of a sensitive nature. For example, it may be the case that the post-compiler 44 during operation thereof ensures that each such code section does not affect system memory. Of course, other bases for filtering code sections may be employed without departing from the spirit and scope of the present invention. Note that if a code section includes sensitive code, it may be that the post-compiler isolates such sensitive code and removes only sub-portions of code on either side of the sensitive code.

In one embodiment of the present invention, the rights client 32 proxy-executes on behalf of the application only if a valid license 36 corresponding to such application 30 is available to the rights client 32. In such a case, it may be that the purpose of each exception and proxy-execution based thereon is merely to occasionally check that the license 36 is still present and still valid. In an alternate embodiment, the rights client 32 proxy-executes on behalf of the application without regard to any corresponding valid license 36. In such a case, it may be that the purpose of each exception and proxy-execution based thereon is merely to tie the application 30 to the rights client 32, which presumably is tied to the computer 110, thus tying the application 30 to the computer 110.

In one embodiment of the present invention, the application 30 as produced by the post-compiler 44 may include multiple types of exceptions, each triggering the rights client 32. However, each different type of exception is handled differently. For one example, one type of exception may require the rights client 32 to check the license 36 while another type may not. For another example, different types of exceptions could require access to different tables 46, or could require different decryption keys and/or methods.

As disclosed herein, the application 30, the rights client 32, and the license 36 are separate constructs. Nevertheless, it should be appreciated that such items may be combined in any manner without departing from the spirit and scope of the present invention. For example, the application 30 could include the rights client 32, or the rights client 32 could include the license 36. Note, though, that in at least some instances combined items may be more susceptible to an attack from a nefarious entity.

As also disclosed herein, the rights client 32 proxy-executes code on behalf of the application 30. Alternatively, the rights client 32 may operate to modify the application 30 to include the to-be-executed code, allow such application 30 to execute such code, and then again modify the application 30 to remove such code. Note, though, that such an arrangement may be more susceptible to attack by a nefarious entity, especially in the moments when the application 30 is modified to include the to-be-executed code.

As may be appreciated, one especially useful aspect of the present invention is that the rights client 32 may now perform especially secure functions on behalf of the application 30 such that a nefarious entity is thwarted from affecting such functions. For example, it may be the case that a term in a license 36 affects how many times the application 30 can perform a specific action. Although the application 30 could obtain such term from such license 36, having the application 30 do so could allow a nefarious entity to intervene in the process to subvert same. Instead, in one embodiment of the present invention, the rights client 32 is employed to proxy-execute code for the application 30 relating to such term in such license 36, including obtaining the term and employing same.

Proxy Execution of Code Based on State Information

As was noted immediately above, it may be the case that a term in a license 36 affects how many times the application 30 can perform a specific action. For example, the license 36 may allow a particular action to take place 5 times, 5 times each instance that the application 30 is instantiated, or the like. Similarly, the license 36 may allow the application 30 to have no more than 5 copies of a resource such as a process instantiated at any one time, or may allow the application to have no more than 5 network connections at any one time, among other things. In any of the aforementioned examples, then, a count must be maintained in a secure manner and as state information. As was noted above, although the application 30 could obtain the license terms relating to such a count from the license 36 and could in fact maintain the count, having the application 30 do so could allow a nefarious entity to intervene to subvert such license terms. Instead, and again, in one embodiment of the present invention, the rights client 32 is employed to proxy-execute code for the application 30 relating to license terms in such license 36 based on state information such as a count, including obtaining the license terms and the count and employing same. Notably, in doing so, the license 36 is referred to by the rights client 32 not just to verify the existence thereof, but also to provide information such as for example a maximum count value.

If indeed the rights client 32 maintains state information relating to a count, the basis of the count may be any basis without departing from the spirit and scope of the present invention. For example, the count can be with regard to a number of copies of a resource instantiated by the application 30, where the corresponding license 36 specifies a maximum value of such count per session of the application 30. Likewise, the count can be with regard to a number of times an incorrect password is entered in connection with the application 30, where the corresponding license 36 specifies a maximum value of such count over all sessions of the application 30.

Notably, such state information as maintained by the rights client 32 with regard to a license 36 and a corresponding application 30 may also be any other state information without departing from the spirit and scope of the present invention. For example, such state information could be a time value relating to a last time the application 30 performed an action, a date value relating to a number of days until the application 30 can perform an action, a monetary value that can be consumed by the application 30, and the like.

In one embodiment of the present invention, the rights client 32 upon referring to a license 36 corresponding to the application 30 with regard to an interrupt or the like encountered at a particular location within the application 30 determines from the license 36 a particular script or the like with instructions for how to process the interrupt, including instructions for creating state information relating to the interrupt if necessary and/or instructions for manipulating the state information. Thus, based on such instructions and related state information, the rights client 32 may determine from the license 36 both the actions that are to be taken to process the interrupt and also whether as a result of such actions the processed interrupt should result in a corresponding code section of the application 30 being decrypted and proxy-executed by the rights client 32 on behalf of the application 30. Note that for the rights client 32 to perform such actions, it may be necessary to include in the table 46 of FIG. 3 for each interrupt an identification of or pointer or reference to a corresponding portion of the license 36, where the corresponding portion includes the aforementioned script that services the interrupt.

Figure 6:
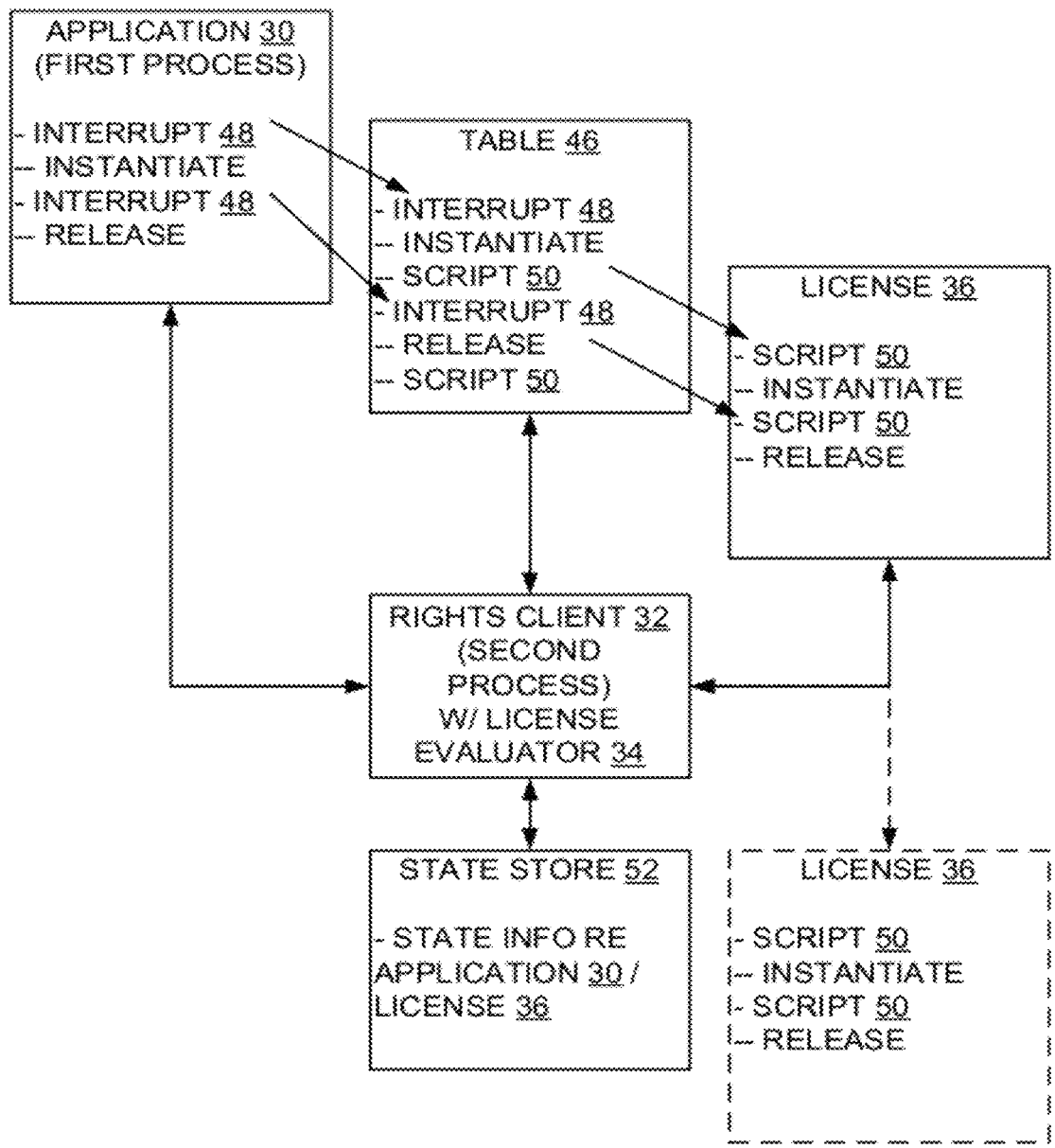
FIG. 6 is a block diagram showing the second computer process proxy-executing code on behalf of the first computer process with the aid of a script and a state store storing state information in accordance with another embodiment of the present invention.

For example, and referring now to FIG. 6, it is seen that a particular interrupt 48 in an application 30 corresponds to a particular script 50 in a corresponding license 36, where the script 50 is to be run in response to encountering the interrupt 48 in the application 30. Supposing that the interrupt 48 relates to a code section that instantiates a resource for the application 30, where the code section is encrypted and stored in some predetermined location, it may be that the table 46 with regard to such interrupt 48 points to an 'instantiate' script 50 in the license 36 that at least in part determines that a maximum number of instantiations of such a resource has not occurred for a current session of the application 30.

As may be appreciated, then, in such an example state information must be maintained by the rights client 32 in connection with the license 36 regarding an 'instantiate' count of how many instantiations of such resource currently exist for the current session of the application 30. In particular, such state information may be maintained by the rights client 32 in an appropriate state store 52, and in an appropriate form. Such store 52 and form may of course be any appropriate store 52 and form without departing from the spirit and scope of the present invention, presuming of course that the store 52 is secure against attacks by nefarious entities and can maintain such state information for extended periods of time if necessary.

Figure 7:
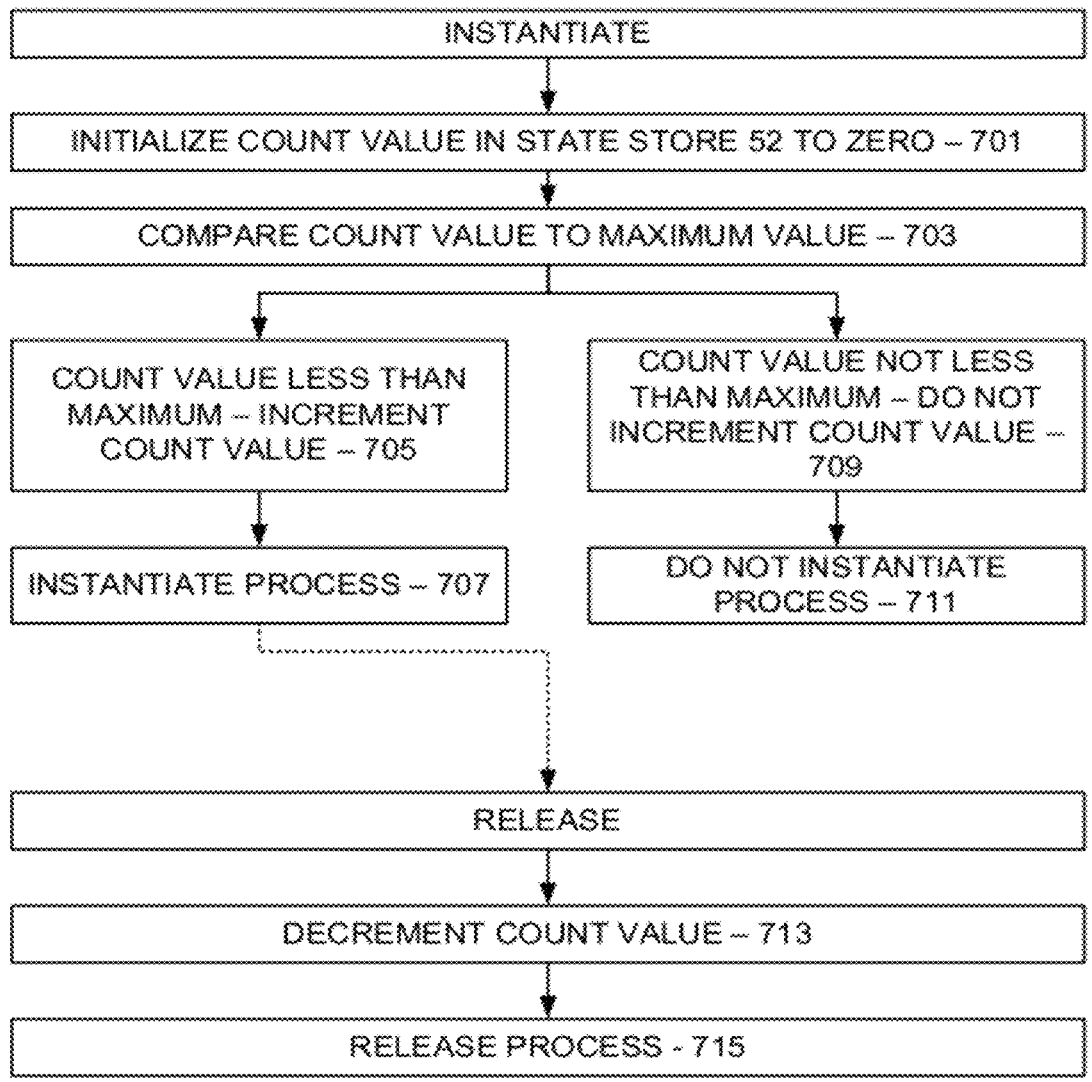
FIG. 7 is a flow diagram showing key steps performed in connection with the first and second processes of FIG. 6 in accordance with another embodiment of the present invention.

As may be appreciated, and referring now to FIG. 7, the state information in the state store 52 regarding the instantiate count should be initialized to zero, either when the application 32 is first instantiated or when the corresponding 'instantiate' interrupt 48 is first encountered during a particular session of the application 30 (step 701). In the former case, it may be that the license 36 includes an initializing script 50 that is triggered by a corresponding interrupt 48 in the application 30 when such application 30 is itself initialized. In the latter case, it may be that the instantiate script 50 of the license 36 includes an initializing portion that initializes the instantiate count if necessary.

In either case, and presuming now that the state store 52 of the rights client 32 includes the instantiate count set to a particular value, the initialize script can be presumed to compare the value of the instantiate count to a predetermined maximum value (step 703). As should be appreciated, if the value of the instantiate count is less than the predetermined maximum value, the instantiate script 50 would continue by incrementing the value of the instantiate count (step 705) and by allowing the rights client 32 to in fact instantiate the process (step 707), presumably by decrypting and proxy-executing the corresponding code section of the application 30. However, if the value of the instantiate count is equal to or greater than the predetermined maximum value, the instantiate script 50 would not increment the value of the instantiate count (step 709) and would not allow the rights client 32 to in fact instantiate the process (step 711).

As may also be appreciated, and still referring to FIG. 7, the state information in the state store 52 regarding the instantiate count should be decremented whenever an instantiated copy of the resource at issue is to be released. In particular, a 'release' interrupt 48 in the application 30 presumably corresponds to a 'release' script 50 in the corresponding license 36, where the release script 50 and the release interrupt 48 presumably relate to a code section that releases an instantiated copy of the resource for the application 30.

Here, the release script 50 presumably decrements the value of the instantiate count as maintained in the state store 52 of the rights client 32 (step 713) and allows the rights client 32 to in fact release the process (step 715), presumably by decrypting and proxy-executing the corresponding code section of the application 30. As may be appreciated, such release script 50 need not do much if anything else, and indeed need not consider whether the value of the instantiate count is greater than a predetermined maximum value, and also need not initialize the value of the instantiate count.

Of course, the particular steps performed by any script 50 in a license 36 are determined according to whatever goal is to be achieved by the corresponding interrupt 48 in the corresponding application, and likewise the particular state information maintained by the rights client 32 in the state store 52 also is determined according to whatever goal is to be achieved. Notably, by placing each script 50 in a license 36, different versions of the application 30 can be achieved by way of different corresponding licenses 36. With regard to the aforementioned instantiate script 52 as an example, different licenses 36 may allow different numbers of the aforementioned resource to be instantiated by way of corresponding different predetermined maximum values in such instantiate script 52.

As thus far disclosed, a particular interrupt 48 in an application 30 corresponds to a particular script 50 in a corresponding license 36, where the script 50 is to be run in response to encountering the interrupt 48 in the application 30. However, it is to be appreciated that the script 50 or at least a portion thereof may instead be located within the rights client 32. For example, it may be that the aforementioned instantiate script 50 is in the rights client 32 except for the predetermined maximum value, which would be set forth in a corresponding license 36. In such an example, the license 36 is greatly simplified inasmuch as such license 36 need not contain the bulk of the instantiate script 50 or any other script 50 for that matter. However, the rights client 32 in such an example must instead hold the instantiate script 50 and all other necessary scripts 50. As a result, new scripts 50 are added by updating the rights client 32.

Note that although the present invention is disclosed herein primarily in terms of a first computer process/application 30 and a second computer process/rights client 32 proxy-executing code on behalf of the first process/application 30, the term 'process' should be broadly construed. Thus, the processes 30, 32 may be any appropriate processes without departing from the spirit and scope of the present invention, and the term 'process' itself should be interpreted to include not only computer processes but any other form of action-taking object, such as for example a driver, an executable, a binary, a batch file or the like running within a process or elsewhere.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a method and mechanism are provided by which a rights client 32 with a license evaluator 34 controls operation and use of an consumer 30 based on a license 36 corresponding thereto. The rights client 32 with the license evaluator 34 executes certain portions of code from a provider 50 on behalf of and as a proxy for the consumer 30, where the license evaluator 34 can determine if the license 36 allows such execution. Thus, the consumer 30 cannot be run outside of the presence of the provider 50. The rights client 32 can be employed to proxy-execute a function of the consumer 30 only if the corresponding license 36 so allows based on a script 50 that performs a logical or mathematical determination. The rights client 32 can securely maintain state information in a state store 52 such as a count relating to the function, as well as other data necessary to determine whether a license 36 for an application 30 allows code of the application to be proxy-executed.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A computer comprising:
   a memory that stores a digital license corresponding to a first process, the license setting forth terms and conditions for a processor operating the first process, and that stores a table separate from the first process;
   a processor that copies a code section from the first process and stores the code section in the table and replaces the code section in the first process code with a triggering device corresponding to a location of the code section in the table, said processor further executing the first process code including the triggering device corresponding to a location of the code section in the table, said processor executing the triggering device and pausing, and said processor further executing code of a second process, the second process including a license evaluator for evaluating the license upon the first process encountering the triggering device to determine whether the first process is to be operated in accordance with the terms and conditions set forth in such license, the second process upon the first process encountering the triggering device choosing whether to proxy-execute the code section on behalf of such first process based at least in part on whether the license evaluator has determined that the first process is to be operated in accordance with the terms and conditions of the license, the license evaluator at least in part performing such determination by running a script corresponding to the triggering device of the first process, wherein the second process receives a signal associated with the triggering device indicating that the second process needs to cause the processor to proxy-execute the code section stored in the table on behalf of the first process, wherein the proxy-execution by the second process includes the second process causing the processor to perform the steps of:

determining an address of the triggering device within the first process, wherein the address is indicative of the location of the code section in the table;

locating the code section based on the determined address;

executing the code section after determining that the first process is operating in accordance with terms and conditions of the digital license corresponding to the first process, the determination being performed at least in part by running said script;

signaling to the first process that the code section has been processed; and the processor resuming the first process, whereby the first process is dependent upon the second process and the license for operation thereof.

2. The computer of claim 1 wherein the first process is an application and the second process is a rights client.

3. The computer of claim 1 wherein the table includes an address of the triggering device in the first process and a reference to the script.

4. The computer of claim 3 wherein the table is set forth in one of the first process and the license.

5. The computer of claim 4 wherein the code section of the first process is encrypted and is decryptable according to a decryption key obtainable by the second process from the license.

6. The computer of claim 1 wherein the triggering device and the script correspond to a mathematical or logical limitation as implemented by the digital license.

7. The computer of claim 1 wherein the triggering device and the script correspond to a count-based limitation as implemented by the digital license, the script including provisions to increment/decrement a count value representative of the count-based limitation, the computer further comprising a state store for the second process to store the count value therein.

8. The computer of claim 7 wherein the script includes provisions to modify at least one value representative of the limitation, the computer further storing the modified value in the state store.

9. The computer of claim 1 wherein the license includes the script corresponding to the triggering device of the first process.

10. The computer of claim 1 wherein the second process includes the script corresponding to the triggering device of the first process.

11. A computer readable storage medium that is not a transient signal, said computer readable storage medium having instructions stored thereon that when executed by a processor cause said processor to execute first and second processes, said medium having stored thereon:

first instructions for copying a code section of the first process, storing the code section in a table separate from the first process, and replacing the code section in the code of the first process by a triggering device corresponding to a location of the code section in the table;

second instructions for processing the first process code including the code having the triggering device such that the triggering device is executed and further processing of the first process code is paused; and third instructions for executing the second process, wherein the second process receives a signal associated with the triggering device indicating that the second process needs to cause the processor to proxy-execute the code section stored in the table on behalf of the first process, wherein the proxy-execution by the second process includes the second process being configured to cause the processor to perform the steps of:

determining an address of the triggering device within the first process, wherein the address is indicative of the location of the code section in the table, locating the code section based on the determined address, executing the code section after determining that the first process is operating in accordance with terms and conditions of a digital license corresponding to the first process, the determination being performed at least in part by running a script corresponding to the triggering device of the first process, and signaling to the first process that the code section has been processed, wherein the second instructions further instruct the processor to resume the first process after the pause whereby the first process is dependent upon the second process for operation thereof.

12. The medium of claim 11 wherein the triggering device and the script correspond to a mathematical or logical limitation as implemented by the digital license.

13. The medium of claim 11 wherein the triggering device and the script correspond to a count-based limitation as implemented by the digital license, further comprising fourth instructions for causing the processor to increment or decrement a count value representative of the count-based limitation and to store the count value.

14. The medium of claim 13 wherein the script includes provisions to modify at least one value representative of the limitation, the further instructions causing the processor to store the modified value.

* * * * *